US010662325B2

(12) United States Patent
Sun et al.

(10) Patent No.: US 10,662,325 B2
(45) Date of Patent: May 26, 2020

(54) POLYESTER COMPOSITIONS, AND PROCESS FOR MAKING ARTICLES THEREFROM

(71) Applicant: ExxonMobil Chemical Patents Inc., Baytown, TX (US)

(72) Inventors: Ying Ying Sun, Shanghai (CN); Yi Ping Ni, Shanghai (CN); Pei Te Bao, Shanghai (CN); Yi Zhou Shi, Shanghai (CN); Xiaoyun Wang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 180 days.

(21) Appl. No.: 15/995,351

(22) Filed: Jun. 1, 2018

(65) Prior Publication Data

US 2019/0016882 A1    Jan. 17, 2019

Related U.S. Application Data

(60) Provisional application No. 62/532,011, filed on Jul. 13, 2017.

(51) Int. Cl.
| | |
|---|---|
| *C08L 67/02* | (2006.01) |
| *C08J 3/00* | (2006.01) |
| *C08J 5/18* | (2006.01) |
| *C08L 67/00* | (2006.01) |
| *C08L 23/16* | (2006.01) |

(52) U.S. Cl.
CPC ............... *C08L 67/02* (2013.01); *C08J 3/005* (2013.01); *C08J 5/18* (2013.01); *C08L 67/00* (2013.01); *C08J 2323/16* (2013.01); *C08J 2367/02* (2013.01); *C08L 23/16* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 3,352,904 A | 11/1967 | Bicking et al. | |
| 3,575,931 A | 4/1971 | Sherman et al. | |
| 4,305,864 A | 12/1981 | Griffin et al. | |
| 4,322,335 A | 3/1982 | Nield | |
| 4,368,288 A | 1/1983 | Nield | |
| 4,390,493 A | 6/1983 | Yasui et al. | |
| 4,393,178 A | 7/1983 | Legras et al. | |
| 4,397,979 A | 8/1983 | Reimschuessel | |
| 4,401,792 A | 8/1983 | Axelrod et al. | |
| 4,425,470 A | 1/1984 | Garcia | |
| 4,551,507 A | 11/1985 | Haylock et al. | |
| 4,558,096 A | 12/1985 | Boon et al. | |
| 4,806,589 A | 2/1989 | Chen et al. | |
| 5,280,066 A | 1/1994 | Tekkanat et al. | |
| 5,342,892 A | 8/1994 | Vanderbilt et al. | |
| 5,344,892 A | 9/1994 | Natarajan et al. | |
| 5,643,988 A | 7/1997 | Nakamura et al. | |
| 5,952,088 A | 9/1999 | Tsai et al. | |
| 7,867,667 B2 | 1/2011 | Song | |
| 2003/0153684 A1* | 8/2003 | Miller ..................... C08L 67/02 | |
| | | | 525/166 |
| 2004/0171758 A1 | 9/2004 | Ellul et al. | |
| 2011/0021706 A1* | 1/2011 | Komiya .................. C08L 23/10 | |
| | | | 525/166 |
| 2013/0209770 A1 | 8/2013 | Topolkaraev et al. | |
| 2013/0210621 A1 | 8/2013 | Topolkaraev et al. | |
| 2013/0210949 A1 | 8/2013 | Scholl et al. | |
| 2013/0210983 A1 | 8/2013 | Topolkaraev et al. | |
| 2014/0017439 A1 | 1/2014 | Siskovich et al. | |
| 2019/0112472 A1* | 4/2019 | Whelan ................... C08L 23/16 | |

FOREIGN PATENT DOCUMENTS

| | | |
|---|---|---|
| EP | 0 021 648 A | 1/1981 |
| EP | 0 351 732 A | 1/1990 |
| EP | 2275493 | 1/2011 |
| JP | 62297350 A | 12/1987 |
| JP | 02242838 A | 9/1990 |
| JP | 2004/149788 A | 5/2004 |
| JP | 2004/149789 A | 5/2004 |
| JP | 2011/194702 A | 10/2011 |
| JP | 2013/070847 A | 4/2013 |
| WO | 94/16010 | 7/1994 |
| WO | 00/52094 A | 9/2000 |
| WO | 2007/002177 | 1/2007 |

OTHER PUBLICATIONS

Garcia, D., "Heterogeneous Nucleation of Polyethylene Terephthalate", American Chemical Society, vol. 25, No. 1, pp. 197-198, (1984).

* cited by examiner

*Primary Examiner* — Michael J Feely
(74) *Attorney, Agent, or Firm* — Catherine L. Bell

(57) ABSTRACT

The present invention relates to a polymer composition comprising a thermoplastic polyester and a propylene-based elastomer, wherein the propylene-based elastomer comprises propylene-derived units and 5 to 30 wt % of α-olefin-derived units, and has a melting temperature of less than 120° C. and a heat of fusion of less than 75 J/g.

25 Claims, No Drawings

US 10,662,325 B2

POLYESTER COMPOSITIONS, AND PROCESS FOR MAKING ARTICLES THEREFROM

CROSS REFERENCE TO RELATED APPLICATIONS

This application claims the benefit of priority from U.S. Provisional Application No. 62/532,011, filed Jul. 13, 2017, which is incorporated herein by reference.

FIELD OF THE INVENTION

The present invention relates to a polymer composition comprising a thermoplastic polyester, and a process for making articles therefrom. In particular, the invention relates to a polymer composition comprising a thermoplastic polyester and a propylene-based elastomer, where the composition has an increased crystallization rate and good processability.

BACKGROUND OF THE INVENTION

Polyesters have become quite an important engineering thermoplastic materials. The two most common polyesters are poly(ethylene terephthalate) (PET) and poly(butylene terephthalate) (PBT), and, to a lesser extent, poly(cyclohexylenedimethylene terephthalate) (PCT). PET has a higher melting point and higher modulus and is economically more attractive than PBT. However, these types of polyesters suffer from slow crystallization rates making it necessary to use long molding cycles and high mold temperatures when fabricating molded parts. PET along with PCT are particularly deficient in this respect which tends to negate their economic advantages, particularly in regard to PET.

It is known that the crystallization rate and crystallization temperature of PET can be increased by the addition of a nucleating agent to a molding composition. Several nucleating agents have the characteristic of promoting rapid crystallization under conditions of rapid cooling from the melt. An acceptable nucleating agent should be highly effective at low concentration in promoting crystallization, and further should be readily dispersible so that rapid and uniform crystallization of the polymer from the melt is possible.

A number of techniques have been applied to improve the crystallization rate of poly(alkylene terephthalates) by way of nucleating the amorphous polymer. These techniques have involved the seeding or nucleation of the amorphous materials in much the same manner as supersaturated organic solutions are seeded to cause a solute to crystallize out; see "Heterogeneous Nucleation of Polyethylene Terephthalate" by D. Garcia, Polymer Preprints, American Chemical Soc., 25(1), 197 (1984).

Commonly employed nucleating agents for PET are the alkali and alkaline earth metal salts of organic acids. U.S. Pat. No. 3,352,904 discloses the sodium and potassium salts of carboxylic acids, as well as the salts of organic polymers containing pendant acidic groups, including carboxylic acid groups, as nucleating agents for PET. U.S. Pat. Nos. 4,322,335; 4,368,288; 4,305,864; 4,390,493; 4,393,178 and EP 21,648 and 351,732 all disclose the use of ionizable metal salts of aromatic ring containing compounds, wherein the aromatic rings are substituted by acid groups which are carboxylic acid, sulfinic acid, phosphonic acid, phosphinic acid and phenolic groups.

U.S. Pat. No. 3,575,931 shows metal salts of carboxylic acids as nucleating agents for PET. U.S. Pat. No. 4,401,792 discloses alkali metal salts of polyethylene ionomers and benzoic acid as nucleating agents for PET. U.S. Pat. No. 4,425,470 discloses alkali metal salts of ethylene terephthalate oligomers as nucleating agents for PET. U.S. Pat. No. 4,551,507 shows alkali and alkaline earth metal carboxylate salts of tertiary and quaternary amines as PET nucleating agents. Other inorganic nucleating agents are disclosed in U.S. Pat. No. 4,397,979 such as certain lithium, manganese, and zirconium salts.

However, when the need exists for very fast crystallization rates or even lower mold temperatures, merely adding greater quantities of inorganic or organic nucleating agents with low molecular weight is not satisfactory, because the incremental effect of such nucleating agents frequently diminishes with greater quantities of the same, and large quantities of such nucleating agents can have an adverse effect on the physical properties of molded articles made from compositions containing the same. Exemplary drawback of polyester compositions with nucleating agents known to the art is that the polymer during its processing suffers a decrease in weight average molecular weight, mostly because of the degradation phenomenon caused by ionic nucleating agents. Further, small molecular weight acids remaining in the polymer after nucleation which are derived from the acid salts cause acid degradation of the PET.

Therefore, there still remains a need for providing rapidly crystallizing polyester compositions in a facile, economic, and simplified manner, particularly absent or substantially absent inorganic or organic nucleating agents with low molecular weight.

SUMMARY OF THE INVENTION

In one aspect, the present invention is to provide a polymer composition comprising a thermoplastic polyester and a propylene-based elastomer, wherein the propylene-based elastomer comprises propylene-derived units and 5 to 30 wt % of α-olefin-derived units, and has a melting temperature of less than 120° C. and a heat of fusion of less than 75 J/g.

In another aspect, the present invention is to provide a process for preparing a molded article and articles made therefrom.

Other embodiments of the invention are described, claimed herein and are apparent by the following disclosure.

DETAILED DESCRIPTION OF ILLUSTRATIVE EMBODIMENTS

The inventive polymer composition herein comprises a thermoplastic polyester and a propylene-based elastomer, wherein the propylene-based elastomer comprises propylene-derived units and 5 to 30 wt % of α-olefin-derived units, and has a melting temperature of less than 120° C. and a heat of fusion of less than 75 J/g. The present invention further provides a process for preparing a molded article comprising the polymer composition, and articles made therefrom. The inventors surprisingly find that absence or substantially absence of inorganic or organic nucleating agents with low molecular weight, the crystallization time of the polymer compositions can be reduced at least 1 minute, or 1.2 minutes, or 1.4 minutes, or 1.6 minutes, or 1.8 minutes, or 2.0 minutes, or 2.2 minutes, or 2.4 minutes, or 2.6 minutes, or 2.8 minutes, or 3.0 minutes, less than the base thermoplastic polyester, as determined by DSC method. In one or more embodiments, crystallization temperature of the polymer compositions can be increased at least 20° C., or 22° C., or 24° C., or 26° C., or 28° C., or 30° C., or 32° C., or 34° C., or 36° C., or 38° C., or 40° C., higher than the base thermoplastic polyester, as determined by DSC method. Therefore, the propylene-based elastomer may be used a crystallization enhancer to provide a rapidly crystallizing polyester composition, in the absence or substantially absence of inorganic or organic nucleating agents with low molecular weight known to the art.

Thermoplastic Polyesters

Suitable thermoplastic polyesters which can be employed to prepare the inventive polymer compositions include crystallizable linear and branched thermoplastic polymers obtained by the condensation of substantially dicarboxylic acids, or ester derivatives thereof, and diols. Suitable dicarboxylic acid components of the more preferred polyesters contain at least 20 wt % aromatic dicarboxylic acid selected from the group consisting of terephthalic acid, isophthalic acid, naphthalene dicarboxylic acid, diphenyl ether dicarboxylic acid, diphenyl dicarboxylic acid, diphenyl sulfone dicarboxylic acid, diphenoxyethane dicarboxylic acid, and the like. The non-aromatic component of the dicarboxylic acid is succinic acid, adipic acid, sebacic acid or the like.

The diol component of the preferred polyesters can be selected from aliphatic diols containing from 2 to 10 carbon atoms and include the likes of ethylene glycol, diethylene glycol, trimethylene glycol and tetramethylene glycol. The term diol as used in the present invention also includes mixtures of the above diols among themselves or with up to 10 wt %, based on the diol, of a polyol having a functionality higher than 2 including triol compounds.

More preferred polyesters are poly (alkylene terephthalates) which have structural units of the formula:

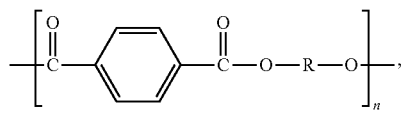

wherein n is an integer ranging from 2 to 6.

A preferred group of polyesters is comprised of polyethylene terephthalate (PET), polypropylene terephthalate (PPT), polybutylene terephthalate (PBT), polycyclohexylenedimethylene terephthalate (PCT), and blends of two or more thereof. While both polypropylene terephthalate and polybutylene terephthalate crystallize faster than PET, they both can benefit by the addition of the PBEs discussed below. PET and PCT are the most preferred because of their superior heat resistance and they receive the maximum benefit in crystallization enhancement.

Suitable thermoplastic polyesters are characterized by having intrinsic viscosities ranging from about 0.4 to about 1.2 dl/g, preferably about 0.5 to about 0.9 dl/g. Essentially, any thermoplastic polyester acceptable for use in molding compositions can be employed in the present invention. Such polyesters are disclosed in U.S. Pat. No. 2,465,319 and may be prepared by the techniques disclosed therein and by U.S. Pat. No. 3,047,539, each of which U.S. patents is incorporated by reference herein.

In a preferred embodiment, the thermoplastic polyester is formed by the reaction of at least one dicarboxylate acid of which at least 20 percent is an aromatic dicarboxylate acid selected from the group consisting of terephthalate acid, isophthalic acid, naphthalene dicarboxylate acid, diphenyl ether dicarboxylic acid, diphenyl dicarboxylate acid, diphenyl sulfone dicarboxylate acid and diphenoxyethane dicarboxylic acid with at least one diol selected from the group of aliphatic diols containing from 2 to 10 carbon atoms.

Propylene-Based Elastomers

The propylene-based polymer or elastomer ("PBE") used in the inventive polymer compositions comprises propylene-derived units and from about 5 wt % to about 30 wt % of one or more comonomers selected from ethylene and/or $C_4$-$C_{12}$ α-olefins. In one or more embodiments, the α-olefin comonomer units may be derived from ethylene, butene, pentene, hexene, 4-methyl-1-pentene, octene, or decene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

In one or more embodiments, the PBE may include at least about 2 wt %, at least about 3 wt %, at least about 4 wt %, at least about 5 wt %, at least about 6 wt %, at least about 7 wt %, or at least about 8 wt %, or at least about 9 wt %, or at least about 10 wt %, or at least about 12 wt % ethylene-derived units. In those or other embodiments, the PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and α-olefin derived units. Stated another way, the PBE may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments, the PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units. In certain embodiments, the PBE may comprise from about 5 wt % to about 25 wt % ethylene-derived units, or from about 9 wt % to about 18 wt % ethylene-derived units.

The PBEs of one or more embodiments are characterized by a melting point (Tm), which can be determined by Differential Scanning Calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the PBE (as determined by DSC) is less than about 120° C., or less than about 110° C., or less than about 100° C., or less than about 95° C., or less than about 90° C.

In one or more embodiments, the PBE may be characterized by its heat of fusion (Hf), as determined by DSC. In one or more embodiments, the PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments, the PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g.

As used within this specification, DSC procedures for determining Tm and Hf include the following. The polymer is pressed at a temperature of from about 200° C. to about 230° C. in a heated press, and the resulting polymer cast film is hung, at about 23° C., in the air to cool. About 6 to 10 mg of the polymer cast film is removed with a punch die. This 6 to 10 mg sample is annealed at about 23° C. for about 80 to 100 hours. At the end of this period, the sample is placed in a DSC (Perkin Elmer Pyris One Thermal Analysis System) and cooled at a rate of about 10° C./min to about −50° C. to about −70° C. The sample is heated at a rate of about 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units, as measured by $^{13}C$ nuclear magnetic resonance ("NMR"), of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index ranging from a lower limit of 4 or 6 to an upper limit of 8 or 10 or 12. The tacticity index, expressed herein as "m/r", is determined by $^{13}C$ NMR. The tacticity index, m/r, is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the PBE may have a percent crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments, the PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature (herein defined as 23° C.), as measured per the ASTM D-792.

In one or more embodiments, the PBE can have a melt index (MI) (ASTM D-1238-E, 2.16 kg@190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

In one or more embodiments, the PBE may have a melt flow rate (MFR), as measured according to ASTM D-1238-E (2.16 kg weight@230° C.), greater than about 1 g/10 min, or greater than about 2 g/10 min, or greater than about 5 g/10 min, or greater than about 8 g/10 min, or greater than about 10 g/10 min. In the same or other embodiments, the PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In certain embodiments, the PBE may have an MFK from about 1 to about 100 g/10 min, or from about 2 to about 75 g/10 min, or from about 5 to about 50 g/10 min The PBE may have a weight average molecular weight (Mw) of from about 100,000 to about 300,000 g/mol, or from about 150,000 to about 250,000 g/mol, or from about 150,000 to about 200,000 g/mol.

The PBE may have a number average molecular weight (Mn) of from about 2,500 to about 2,500,000 g/mol, or from about 5,000 to about 500,000 g/mol, or from about 10,000 to about 250,000 g/mol, or from about 25,000 to about 200,000 g/mol.

The PBE may have a Z-average molecular weight (Mz) of from about 10,000 to about 7,000,000 g/mol, or from about 50,000 to about 1,000,000 g/mol, or from about 80,000 to about 700,000 g/mol, or from about 100,000 to about 500,000 g/mol.

The molecular weight distribution (MWD, equal to Mw/Mn) of the PBE may be from about 1 to about 40, or from about 1 to about 15, or from about 1.8 to about 5, or from about 1.8 to about 3.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based elastomer composition comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, where the percentage by weight is based upon the total weight of the propylene-derived, α-olefin-derived, and diene-derived units.

Optionally, the PBE may be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, or acrylates. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 to about 6 wt %, at least about 0.5 wt %, or at least about 1.5 wt %.

In one or more embodiments, the PBE is a reactor blend of a first polymer component and a second polymer component, wherein the first polymer component comprises propylene and an α-olefin and has an α-olefin content $R_1$ of from greater than 5 to less than 30 wt % α-olefin, preferably from greater than 10 to less than 25 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin, preferably from greater than 2 to less than 8 wt % α-olefin, where the percentage by weight is based upon the total weight of the propylene-derived and α-olefin derived units of the second polymer component. The PBE comprises from 1 to 25 wt % of the second polymer component and from 75 to 99 wt % of the first polymer component, based on the weight of the propylene-based elastomer.

Suitable commercially available propylene-based polymers include Vistamaxx™ Performance Polymers from ExxonMobil Chemical Company and Versify™ Polymers from The Dow Chemical Company, Midland, Mich.

Molded Articles and Process Making Thereof

The inventive polymer compositions herein may comprise the above thermoplastic polyester and the propylene-based elastomer. In some embodiments, the polymer compositions may also exhibit advantageous crystallization characteristics, in the absence or substantially absence of inorganic or organic nucleating agents with low molecular weight. Higher crystallization rates and lower crystallization times can lead to shorter manufacturing time when making injection molded articles. In certain embodiments, the inventive compositions have a reduced crystallization time of at least 1.0 minute, or 1.2 minutes, or 1.4 minutes, or 1.6 minutes, or 1.8 minutes, or 2.0 minutes, or 2.2 minutes, or 2.4 minutes, or 2.6 minutes, or 2.8 minutes, or 3.0 minutes, less than the base thermoplastic polyester, as determined by DSC method. In certain embodiments, the inventive compositions have an increased crystallization temperature of at least 20° C., or 22° C., or 24° C., or 26° C., or 28° C., or 30° C., or 32° C., or 34° C., or 36° C., or 38° C., or 40° C., higher than the base thermoplastic polyester, as determined by DSC method.

The polymer compositions useful for injection molded articles may further comprises one or more additive components in addition to the above thermoplastic polyester and the propylene-based elastomer described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed.

In some embodiments, the invention provides a process for preparing a molded article, comprising:

(a) co-extruding a thermoplastic polyester and a propylene-based elastomer by a co-rotating twin-screw extruder to produce a polymer composition; and (b) molding the polymer composition through injection molding machine to produce a molded article; wherein, the propylene-based elastomer comprises propylene-derived units and 5 to 30 wt % of α-olefin-derived units, and has a melting temperature of less than 120° C. and a heat of fusion of less than 75 J/g.

In some embodiments, the injection molding machine runs at an injection speed of from 50 to 1000 rpm, preferably 100 to 500 rpm, more preferably 100 to 300 rpm, and/or at a barrel temperature of from 200 to 600° C., preferably from 250 to 500° C., more preferably from 300 to 400° C.

Prior to co-extruding, the thermoplastic polyester may be dried at a temperature of from 80 to 150° C., preferably 100 to 140° C., more preferably 110 to 130° C., over a time period of from 6 to 36 hours, preferably 10 to 24 hours, more preferably 12 to 18 hours.

In some embodiments, crystallization temperature of the polymer composition is increased at least 20° C., or 22° C., or 24° C., or 26° C., or 28° C., or 30° C., or 32° C., or 34° C., or 36° C., or 38° C., or 40° C., over the base thermoplastic polyester, and/or crystallization time of the polymer composition is reduced at least 1.0 minute, or 1.2 minutes, or 1.4 minutes, or 1.6 minutes, or 1.8 minutes, or 2.0 minutes, or 2.2 minutes, or 2.4 minutes, or 2.6 minutes, or 2.8 minutes, or 3.0 minutes, less than the base thermoplastic polyester, as determined by DSC method.

The inventive compositions may advantageously exhibit decreased mixer torque, which indicates a higher flow rate and improved processability. For example, the mixer torque for co-extruding the composition is reduced at least 10%, 20%, 30%, 40%, 50%, 60%, 70%, 80%, 90%, 100%, over the base thermoplastic polyester. The mixer torque may be measured while mixing the polymer composition in a Brabender mixer for 10 minutes with a 50 rpm rotor rate at 120° C.

However, the inventive compositions may be prepared by any procedure that produces a mixture of the components, e.g., dry blending, melt blending, etc. In certain embodiments, a complete mixture of the polymeric components is indicated by the uniformity of the morphology of the dispersion of the polymer components. In a preferred embodiment, the thermoplastic polyester is present in the compositions in an amount in the range from 1 to 30 wt %, alternatively 2, or 4, or 6, or 8, or 10 wt % to 20, or 22, or 24, or 26, or 28 wt %, preferably from 5 to 25 wt %, more preferably from 10 to 20 wt %, based on the total weight of the polymer compositions.

Melt Blend

Continuous melt mixing equipment are generally used. These processes are well known in the art and include single and twin screw compounding extruders as well as other machines and processes, designed to homogenize the polymer components intimately.

Dry Blend

Dry blending is accomplished by combining the thermoplastic polyesters and the propylene-based elastomers in a dry blending equipment. Such equipment and processes are well known in the art and include a drum tumbler, a double cone blender, etc. In this case, the thermoplastic polyesters and the propylene-based elastomers are melted and homogenized in the process extruder similar to the melt blend process. Instead of making the pellets, the homogenized molten polymer is delivered to the die or spinnerett to form the articles.

Test Methods

The parameters cited below were determined in accordance with the following test procedures. Where any one of these properties is referenced in the appended claims, it is to be measured in accordance with the following, specified test procedure.

Intrinsic Viscosity

Intrinsic viscosity (IV) denotes the viscosity of a polymer solution at zero concentration. In accordance with ASTM D4603, inherent viscosity is determined by making soluble polyester at 0.50% concentration in a 60/40 phenol/1,1,2,2-tetrachloroethane solution by means of a Glass Capillary Viscometer.

Melt Flow Rate (MFR)

MFR is defined in grams of polymer per 10 min (g/10 min or its equivalent unit dg/min) and was measured according to ASTM D1238 (2.16 kg, 230° C.). For reactor granule and/or powder PP samples that are not stabilized, the following sample preparation procedure is followed before measuring the MFR. A solution of butylated hydroxy toluene (BHT) in hexane is prepared by dissolving 40±1 grams of BHT into 4000±10 ml of hexane. Weigh 10±1 grams of the granule/powder sample into an aluminum weighing pan. Add 10±1 ml of the BHT/hexane solution into the aluminum pan under a hood. Stir the sample, if necessary, to thoroughly wet all the granules. Place the sample slurry in a vacuum oven at 105°±5° C. for a minimum of 20 min. Remove the sample from the oven and place in a nitrogen purged desiccator a minimum of 15 minutes allowing the sample to cool. Measure the MFR following ASTM D1238 procedure.

Crystallization Temperature ($T_c$) and Melting Temperature ($T_m$)

In any embodiment of the invention, the polymer compositions described herein may have a crystallization temperature ($T_c$) and a melting temperature ($T_m$) as described below. Differential Scanning Calorimetry (DSC), commercially available equipment such as a TA Instruments 2920 DSC, was used. Typically, 6 to 10 mg of the sample, that has been stored at room temperature (23° C.) for at least 48 hours, is sealed in an aluminum pan and loaded into the instrument at 23° C. All heating and cooling rates are 10° C./min. The crystallization temperature ($T_c$) and a melting temperature ($T_m$) were measured as follows: (1) the sample is cooled to −50° C.; (2) the sample is held at −50° C. for 10 minutes; (3) the sample is heated from −50° C. to 300° C.; (4) the sample is held at 300° C. for 5 minutes; (5) the sample is cooled from 300° C. to −50° C. at 10° C./min; (6) the sample is held at −50° C. for 10 minutes; and (7) the sample is heated from −50° C. to 300° C. at 10° C./min. The maximum of the highest temperature peak during the second melt is considered to be the melting temperature ($T_m$) of the polymer compositions.

Crystallization Time ($t_c$)

In any embodiment of the invention, the polymer compositions described herein may have a crystallization temperature ($T_c$) and a melting temperature ($T_m$) as described below. Differential Scanning Calorimetry (DSC), commercially available equipment such as a TA Instruments 2920 DSC, was used. Typically, 6 to 10 mg of the sample, that has been stored at room temperature (23° C.) for at least 48 hours, is sealed in an aluminum pan and loaded into the instrument at 23° C. All heating and cooling rates are 10° C./min. Isothermal crystallization studies using differential scanning calorimetry (DSC) method were conducted by heating the polymer samples to 300° C., holding the sample for five (5) minutes at 300° C., and then cooling down the sample to 72° C., and allowing the polymer to crystallize at the specified temperature. The completed crystallization time ($t_c$) was recorded to evaluate crystallization rate of the polymer compositions.

Molecular Weight Characteristics

The molecular weight properties (Mz, Mw, Mn, Mw/Mn, etc.) were determined with a high temperature Gel Permeation Chromatography (PolymerChar GPC-IR) equipped with a multiple-channel band filter based Infrared detector ensemble IR5, in which a broad-band channel is used to measure the polymer concentration while two narrow-band channels were used for characterizing composition. Three Agilent PLgel 10 μm mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 μm Teflon filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. A given amount of polymer sample was weighed and sealed in a standard vial with 10 μL flow marker (heptane) added to it. After loading the vial in the autosampler, polymer was automatically dissolved in the instrument with 8 mL added TCB solvent. The polymer was dissolved at 160° C. with continuous shaking for about 1 hour for most PE samples or 2 hours for PP samples. The TCB densities used in concentration calculation were 1.463 g/ml at room temperature (23° C.) and 1.284 g/ml at 145° C. The sample solution concentration was from 0.2 to 2.0 mg/ml, with lower concentrations being used for higher molecular weight samples. The MWD values can be determined to ±0.05.

The concentration, c, at each point in the chromatogram was calculated from the baseline-subtracted IR5 broadband signal, I, using the following equation:

$$c = \alpha I,$$

where α is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight was determined by combining the universal calibration relationship with the column calibration, which was performed with a series of monodispersed polystyrene (PS) standards. The MW was calculated at each elution volume with the following equation:

$$\log M_X = \frac{\log(K_X/K_{PS})}{a_X + 1} + \frac{a_{PS} + 1}{a_X + 1} \log M_{PS},$$

where the variables with subscript "X" stand for the test sample while those with subscript "PS" stand for "polystyrene" sample. In this method, $a_{PS}=0.67$ and $K_{PS}=0.000175$ while $a_X$ and $K_X$ were obtained from published literature.

Specifically, a/K=0.695/0.000579 for polyethylene homopolymer and 0.705/0.0002288 for polypropylene homopolymer.

The universal calibration method was used for determining the molecular weight distribution (MWD, Mw/Mn) and molecular-weight averages (Mn, Mw, Mz, etc.) of eluting polymer fractions. Thirteen narrow molecular-weight distribution polystyrene standards (obtained from Polymer Labs, UK) within the range of 1.5-8200 kg/mol were used to generate a universal calibration curve. Mark-Houwink parameters were obtained from Appendix I of Mori, S.; Barth, H. G. Size Exclusion Chromatography, (Springer, 1999). For polystyrene K=1.38×10$^{-4}$ dl/g and α=0.7; and for polyethylene K=5.05×10$^{-4}$ dl/g and α=0.693 were used. For a polymer fraction, which eluted at a temperature step, that has a weight fraction (weight % recovery) of less than 0.5%, the MWD and the molecular weight averages were not computed; additionally, such polymer fractions were not included in computing the MWD and the molecular-weight averages of aggregates of fractions.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Tables 1 provides parameters of the thermoplastic polyesters used to prepare the polymer compositions of the present invention, two grades of polyester teraphthalates obtained from China Resources Packing Materials Co., Ltd., where "PET 1" is CR6612, and "PET 2" is CR8816. The PBEs used in the examples were prepared using a solution polymerization process in parallel reactors having a metallocene-based catalyst, the properties of which are outlined in Table 2.

TABLE 1

Exemplary Polyesters

| Polyester | Intrinsic Viscosity |
|---|---|
| PET 1 | 0.59 |
| PET 2 | 0.88 |

TABLE 2

Exemplary Propylene-Based Elastomers

| PBE | MFR | Ethylene Content wt % |
|---|---|---|
| PBE1 | 8 | 4 |
| PBE2 | 3 | 16 |
| PBE3 | 20 | 15 |

Polyesters were dried over 12 hours at 120° C. to avoid possible moisture-induced degradation prior to blending. Blends of polyesters with PBEs were prepared using a twin-screw extruder with barrel temperature at 270° C. and a screw speed of 180 rpm.

Crystallization characteristics of the inventive polymer compositions are provided in Table 3, and reference examples 3-1 and 3-5 are purely polyesters free of the PBEs. These characteristics are related to the manufacturing time of the molding process, as the higher the crystallization rate and lower the crystallization time, the shorter the manufacturing time becomes.

Table 3 shows crystallization temperature and melting temperature for the inventive polymer compositions. Crystallization temperature and melting temperature were measured by Differential Scanning Calorimeter (DSC) method in non-isothermal crystallization procedure. The crystallization temperature of the inventive polymer compositions is increased around 30° C. by adding with 10 wt % PBEs, meanwhile without much influence on melting temperature.

Crystallization time was measured by DSC in isothermal crystallization procedure. Table 3 shows that crystallization time favorably decreases with the increase of the amount of PBE in the polymer compositions, and thus crystallization rate is increased.

TABLE 3

Crystallization Characteristics for Inventive Polymer Compositions

| No. | Polymer Compositions | Crystallization Temperature (° C.) | Melting Temperature (° C.) | Crystallization Time (min) |
|---|---|---|---|---|
| 3-1 | PET1 | 168 | 242 | 2.9 |
| 3-2 | PET1 + 10 wt % PBE1 | 199 | 248 | 2.8 |
| 3-3 | PET1 + 10 wt % PBE2 | 202 | 249 | 2.1 |
| 3-4 | PET1 + 10 wt % PBE3 | 200 | 249 | 2.4 |
| 3-5 | PET2 | 164 | 246 | 6.2 |
| 3-6 | PET2 + 10 wt % PBE1 | 192 | 248 | 5.6 |
| 3-7 | PET2 + 10 wt % PBE2 | 193 | 248 | 4.0 |
| 3-8 | PET2 + 10 wt % PBE3 | 192 | 247 | 4.6 |

Table 4 provides processability for the polymer composition during extrusion process. While only the mixer torque values of PBE3 are reported, it is expected that the other PBEs of Table 2 would display similar processability. The torque was measured for each of the polymer compositions, as reported in N·m, during the mixing process by twin screw extruder described above used to prepare the polymer compositions. It is the average Torque value by recording 20 points after the mixing processing stabilizing. The torque of the mixer may be correlated to the viscosity of the polymer compositions, and hence processability of the polymer compositions. Low mixer torque generally indicates a higher flow and therefore improved processability of the polymer compositions. Table 4 shows that mixer torque favorably decreases with the increase in the amount of PBE in the polymer compositions. Specifically, the mixer torque for polymer composition having 10 wt % PBE was 26 to 40 N·m, and for compositions having about 20 wt % PBE was 19 to 27 N·m.

TABLE 4

Mixer Torque for Polymer Compositions during Extrusion Process

| No. | Polymer Composition | Torque (N · m) | Torque Reduction (%) |
|---|---|---|---|
| 4-1 | PET1 | 70 | — |
| 4-2 | PET1 + 10 wt % PBE3 | 26 | 63 |
| 4-3 | PET1 + 20 wt % PBE3 | 19 | 73 |
| 4-4 | PET2 | 73 | — |
| 4-5 | PET2 + 10 wt % PBE3 | 40 | 45 |
| 4-6 | PET2 + 20 wt % PBE3 | 27 | 63 |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

The invention claimed is:

1. A polymer composition comprising a thermoplastic polyester and a propylene-based elastomer, wherein the propylene-based elastomer comprises propylene-derived units and 5 to 30 wt % of α-olefin-derived units, and has a melting temperature of less than 120° C. and a heat of fusion of less than 75 J/g.

2. The polymer composition of claim 1, wherein the thermoplastic polyester is a poly(alkylene terephthalate) having repeating units of the formula:

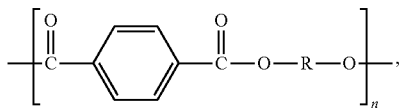

wherein n is an integer ranging from 2 to 6.

3. The polymer composition of claim 1, wherein the thermoplastic polyester is selected from a group consisting of polyethylene terephthalate (PET), polypropylene terephthalate (PPT), polybutylene terephthalate (PBT), polycyclohexylenedimethylene terephthalate (PCT), and combinations thereof.

4. The polymer composition of claim 1, wherein the thermoplastic polyester is polyethylene terephthlate.

5. The polymer composition of claim 1, wherein the thermoplastic polyester has an intrinsic viscosity of from 0.4 to 1.2 dl/g.

6. The polymer composition of claim 1, wherein the thermoplastic polyester is formed by the reaction of at least one dicarboxylate acid of which at least 20 wt % is an aromatic dicarboxylate acid selected from the group consisting of terephthalate acid, isophthalic acid, naphthalene dicarboxylate acid, diphenyl ether dicarboxylic acid, diphenyl dicarboxylate acid, diphenyl sulfone dicarboxylate acid and diphenoxyethane dicarboxylic acid with at least one diol selected from the group of aliphatic diols containing from 2 to 10 carbon atoms.

7. The polymer composition of claim 1, which comprises 1 to 30 wt % of the propylene-based elastomer, based on the total weight of the composition.

8. The polymer composition of claim 1, wherein the propylene-based elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin, where the percentage by weight is based upon the total weight of the propylene-derived and α-olefin derived units of the second polymer component.

9. The polymer composition of claim 8, wherein the first polymer component has an α-olefin content $R_1$ of from 10 to 25 wt % α-olefin, based on the weight of the first polymer component.

10. The polymer composition of claim 8, wherein the second polymer component has an α-olefin content $R_2$ of from greater than 2 to less than 8 wt % α-olefin, based on the weight of the second polymer component.

11. The polymer composition of claim 8, where the propylene-based elastomer comprises from 1 to 25 wt % of the second polymer component and from 75 to 99 wt % of the first polymer component, based on the weight of the propylene-based elastomer.

12. The polymer composition of claim 1, wherein nucleating agents are substantially absent.

13. The polymer composition of claim 1, wherein the composition has an increased crystallization temperature of at least 20° C. higher than the base thermoplastic polyester, as determined by DSC method.

14. The polymer composition of claim 1, wherein the composition has a reduced crystallization time of at least one minute less than the base thermoplastic polyester, as determined by DSC method.

15. A molded article made from the polymer composition of claim 1.

16. A film or nonwoven fabric comprising the polymer composition of claim 1.

17. A process for preparing a molded article, comprising:
(a) co-extruding a thermoplastic polyester and a propylene-based elastomer by a co-rotating twin-screw extruder to produce a polymer composition; and
(b) molding the polymer composition through injection molding machine to produce a molded article;
wherein, the propylene-based elastomer comprises propylene-derived units and 5 to 30 wt % of α-olefin-derived units, and has a melting temperature of less than 120° C. and a heat of fusion of less than 75 J/g.

18. The process of claim 17, wherein the thermoplastic polyester is a poly(alkylene terephthalate) having repeating units of the formula:

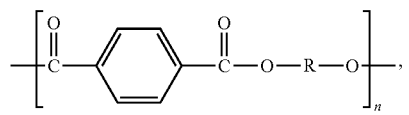

wherein n is an integer ranging from 2 to 6.

19. The process of claim 17, wherein the thermoplastic polyester is polyethylene terephthlate.

20. The process of claim 17, which the polymer composition comprises 1 to 30 wt % of the propylene-based elastomer, based on the total weight of the composition.

21. The process of claim 17, wherein the injection molding machine runs at an injection speed of from 100 to 300 rpm and/or at a barrel temperature of from 250 to 500° C.

22. The process of claim 17, wherein the thermoplastic polyester is dried at a temperature of from 80 to 150° C. over a time period of from 6 to 36 hours prior co-extruding.

23. The process of claim 17, wherein the crystallization temperature of the polymer composition is increased at least 20° C. over the base thermoplastic polyester, as determined by DSC method.

24. The process of claim 17, wherein the crystallization time of the polymer composition is reduced at least one minute less than the base thermoplastic polyester, as determined by DSC method.

25. The process of claim 17, wherein mixer torque of co-extruding the polymer composition is reduced at least 40% over the base thermoplastic polyester.

* * * * *